(12) United States Patent
Domnanish et al.

(10) Patent No.: US 8,947,975 B2
(45) Date of Patent: Feb. 3, 2015

(54) TIME-VARIABLE GAIN FOR CORRECTION OF FLUID ATTENUATION IN DOWNHOLE ACOUSTIC TOOLS

(75) Inventors: James Domnanish, Spring, TX (US); Paul Lowson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 564 days.

(21) Appl. No.: 12/466,206

(22) Filed: May 14, 2009

(65) Prior Publication Data

US 2010/0290312 A1 Nov. 18, 2010

(51) Int. Cl.
*G01V 1/00* (2006.01)
*G01V 1/48* (2006.01)

(52) U.S. Cl.
CPC .............. *G01V 1/48* (2013.01); *G01V 2210/50* (2013.01); *G01V 2210/54* (2013.01); *G01V 2210/584* (2013.01)
USPC .............................. 367/28; 367/27; 166/177.2

(58) Field of Classification Search
CPC . G01V 1/48; G01V 2210/50; G01V 2210/54; G01V 2210/584
USPC ............... 73/152.01, 152.03, 152.15, 152.18, 73/152.43, 152.47; 175/50; 181/102, 105, 181/106, 402; 324/303, 333, 351; 364/422; 367/25, 27, 28, 31, 32, 35, 75, 88, 106, 367/156, 168, 900, 912, 30, 66, 902, 65, 87, 367/98, 114, 115; 702/6, 11; 327/91; 341/139; 342/91, 205; 375/317; 166/177.2
See application file for complete search history.

(56) References Cited

U.S. PATENT DOCUMENTS

| | | | | |
|---|---|---|---|---|
| 2,728,900 A | * | 12/1955 | Ross | 367/87 |
| 3,676,842 A | * | 7/1972 | Lee | 367/30 |
| 3,683,324 A | * | 8/1972 | Hoxsie | 367/114 |
| 3,742,438 A | * | 6/1973 | Brede et al. | 367/98 |
| 4,198,702 A | * | 4/1980 | Clifford | 367/88 |
| 4,581,725 A | * | 4/1986 | Pilarcik, Jr. | 367/66 |
| 4,658,383 A | | 4/1987 | Zimmer | |
| 4,700,803 A | * | 10/1987 | Mallett et al. | 181/106 |
| 4,764,903 A | | 8/1988 | Siebert | |
| 4,852,576 A | | 8/1989 | Inbar et al. | |
| 4,855,965 A | | 8/1989 | Rambow | |
| 5,214,251 A | | 5/1993 | Orban et al. | |
| RE34,975 E | | 6/1995 | Orban et al. | |
| 5,541,889 A | | 7/1996 | Priest et al. | |

(Continued)

OTHER PUBLICATIONS

Wood et al., "Seismic Signal Processing," Proc. IEEE, vol. 63, No. 4, Apr. 1975, pp. 649-661.*

*Primary Examiner* — Daniel L Murphy
(74) *Attorney, Agent, or Firm* — Cantor Colburn LLP

(57) ABSTRACT

An apparatus for use in a wellbore is provided that in one embodiment may include at least one transmitter configured to generate acoustic signals in the wellbore, at least one receiver configured to receive acoustic signals from a formation surrounding the wellbore in response to the transmitted acoustic signal and also configured to provide electrical signals representative of the received acoustic signals, a circuit configured to apply a time-variable gain to the electrical signals to amplify the electrical signals, and a processor configured to process the amplified electrical signals and provide a property of interest.

20 Claims, 4 Drawing Sheets

(56) References Cited

U.S. PATENT DOCUMENTS

| | | |
|---|---|---|
| 5,640,371 A | 6/1997 | Schmidt et al. |
| 5,642,327 A | 6/1997 | Schiflett et al. |
| 5,644,550 A * | 7/1997 | Priest .............................. 367/35 |
| 6,531,881 B1 | 3/2003 | Cordes et al. |
| 6,891,777 B2 | 5/2005 | Pabon et al. |
| 7,587,936 B2 * | 9/2009 | Han ........................... 73/152.43 |
| 2005/0226098 A1 | 10/2005 | Engels et al. |
| 2008/0128166 A1 * | 6/2008 | Forgang et al. ................. 175/50 |

* cited by examiner

US 8,947,975 B2

TIME-VARIABLE GAIN FOR CORRECTION OF FLUID ATTENUATION IN DOWNHOLE ACOUSTIC TOOLS

BACKGROUND

1. Field of the Disclosure

The disclosure herein relates generally to downhole acoustic well logging apparatus and methods.

2. Background Information

Acoustic logging tools are commonly used for logging wellbores to estimate one or more properties of the formation surrounding the tools for the purpose of producing hydrocarbons (oil and gas) therefrom. One type of acoustic tool provides images of the wellbore wall. One such tool includes a rotating transducer that transmits acoustic signals toward the wellbore wall and receives acoustic signals reflected from the wellbore wall. The received acoustic signals are converted into electrical signals, which signals are amplified, typically by a constant gain amplifier, and then processed to determine certain downhole parameters, such as the amplitude and time of arrival of the received signals. The fluid in the wellbore attenuates the transmitted acoustic signals and the reflected signals. This attenuation of the acoustic signals, in large part, depends upon the type of fluid in the wellbore. The fluid in the wellbore may be a water-based mud or an oil-based mud. The fluid density varies among muds. The attenuation of the acoustic signals depends upon the type and density of the mud. The constant gains used to amplify the received acoustic signals in the acoustic logging tools sometimes produce noisy signals because of the continued ringing effect of the transmitted signals.

The disclosure herein provides an acoustic logging tool that mitigates some of the effects of transmitter ringing and other unwanted downhole acoustic signals on the signals received in response to the transmitted signals.

SUMMARY

In one aspect, an apparatus for use in a wellbore is provided that in one embodiment may include: at least one transmitter configured to generate acoustic signals in the wellbore; at least one receiver configured to receive acoustic signals from a formation surrounding the wellbore in response to the transmitted acoustic signals and to provide electrical signals representative of the received acoustic signals; a circuit configured to apply a time-variable gain to the electrical signals; and a processor configured to process the amplified electrical signals and provide a property of interest.

In another aspect, a method for estimating a property of interest relating to a formation surrounding a wellbore is disclosed. In one embodiment, the method may include: determining a time-variable gain relating to a selected fluid; generating acoustic signals in the wellbore; generating electrical signals representative of acoustic signals received by a sensor from the formation, responsive to the generated acoustic signals; amplifying the electrical signals by applying the time-variable gain to the signals; and processing the amplified signals to estimate the property of interest.

Examples of the more important features of an apparatus and a method for determining a parameter of interest utilizing acoustic signals downhole are summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWINGS

The present disclosure is best understood with reference to the accompanying figures in which like numerals generally refer to like elements and wherein.

DETAILED DESCRIPTION OF THE DRAWINGS

Figure 1:
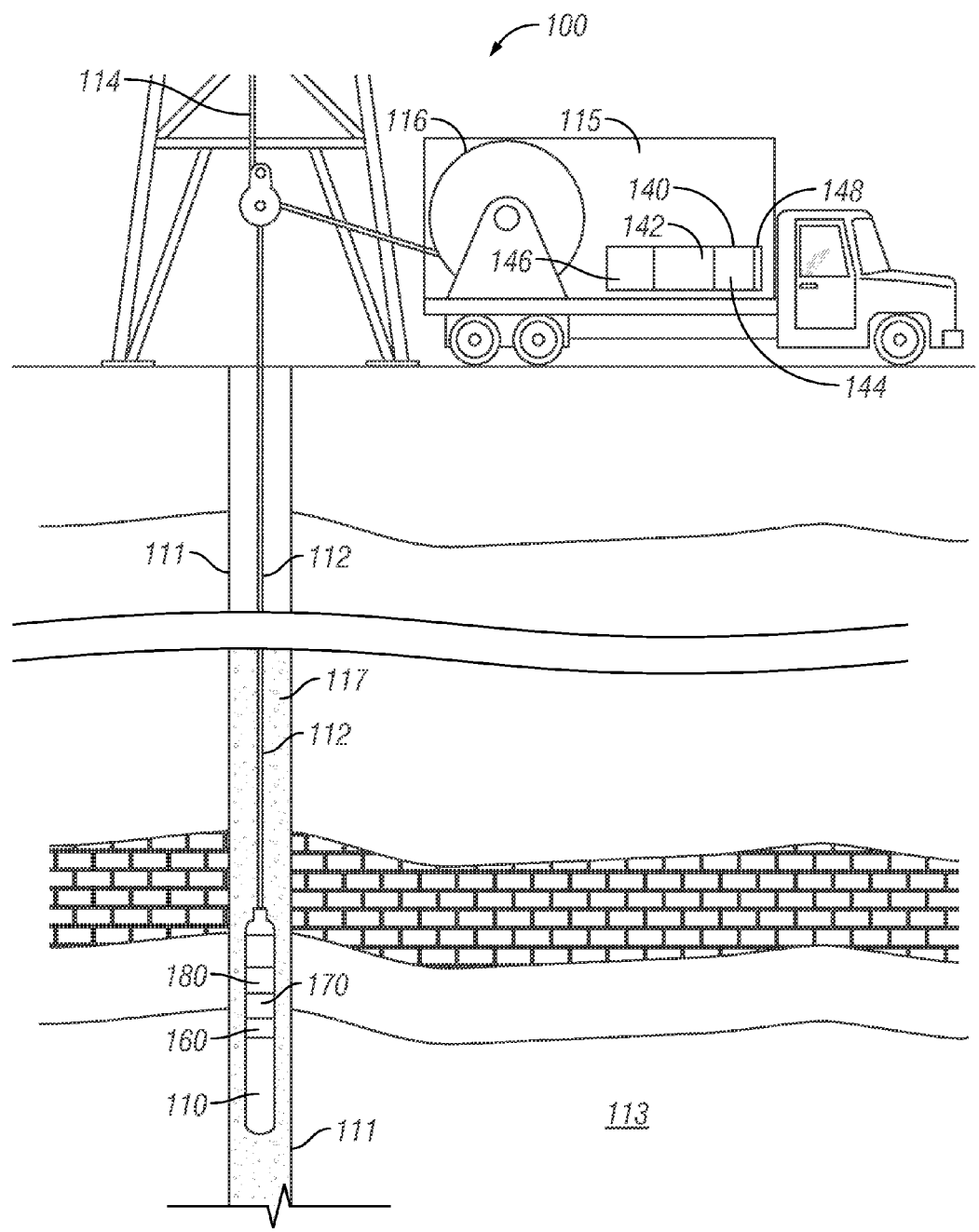
FIG. 1 shows an exemplary well logging system that includes an acoustic imaging tool made according to one aspect of the disclosure.

FIG. 1 is a schematic diagram of well logging system 100 that includes an acoustic logging tool 110 (also referred to herein as the "tool") shown suspended in a borehole (or wellbore) 111 penetrating an earth formation 113 by a suitable conveying member 112. The conveying member 112 may be a wireline cable, coiled tubing or slickline. A suitable mechanism, such as a spool 116, mounted on a truck or another platform 115 disposed at the surface may be utilized to raise and lower the logging tool 110. A wireline cable typically includes a number of conductors (typically seven) configured to provide two-way data communication between a controller 140 (also referred to herein as the "surface controller" or the "surface control unit") and the tool 110 as well as the electrical power from the surface to the tool 110. The controller 140 may be a computer-based unit. The controller 140 may include a processor 142 (such as a microprocessor), a suitable data storage device 144 (including, but not limited to, a solid state memory, hard disk, and magnetic tape) for storing data and computer programs 146 containing instruction for use by the processor 142. Any suitable display device 148, such as a monitor, may be provided to display images and other data during logging of the borehole 111. During logging operations, the controller 140 transmits operating instructions or commands to the tool 110, receives data from the tool and processes the received data in accordance with the instruction in the program 146. The controller 140 may store any or all of the processed data, display the results, including images of the borehole derived from data provided by the tool 110 and send such information to a remote unit (not shown) for further processing of downhole data. In one aspect, the tool 110 is an ultrasonic imaging tool configured to provide images of the wellbore wall. The components and operation of the tool 110 are described in more detail in reference to FIGS. 2-4.

Figure 2:
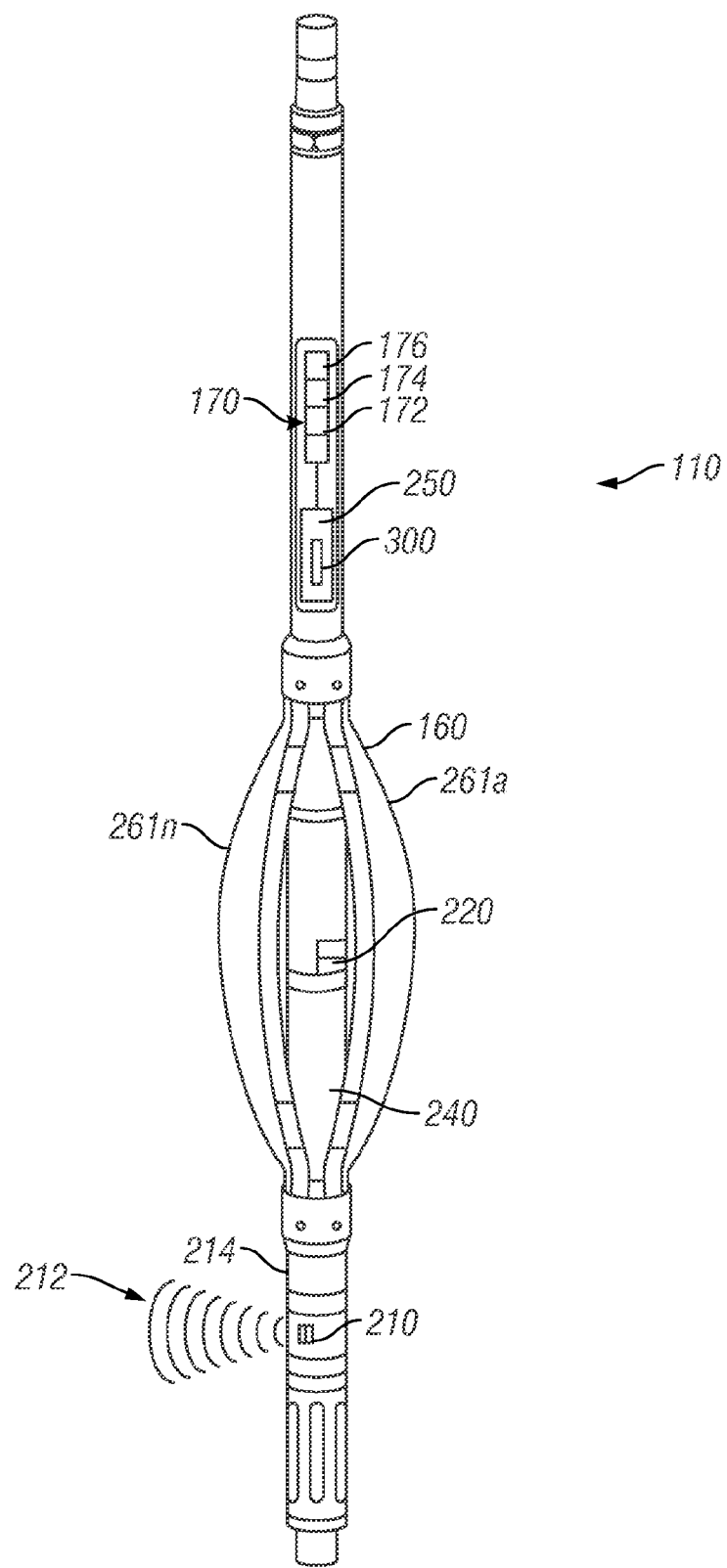
FIG. 2 shows certain details of the acoustic tool shown in FIG. 1.

FIG. 2 is a schematic external view of one embodiment of the tool 110 see FIG. 1) that may be utilized in the system shown in FIG. 1. The tool 110 is shown to include an acoustic transducer 210, which may be configured to transmit acoustic signals 212 into the formation 113 surrounding the wellbore 111 and receive signals reflected from the wellbore wall 117 in response to the transmitted signals 212. In one aspect, the transducer 210 may transmit ultrasonic acoustic signals at frequencies at which the transmitted signals are reflected by the wellbore wall 117 and received by the transducer 210. In one aspect, the center frequency of the transmitted signals may be in the range of 300 KHz to 500 KHz. In another aspect, the transmitter and receiver may be separate devices. A transformer 214 supplies the power to the transducer 210. In one aspect, both the transducer 210 and the transformer 214 may be configured to rotate. Logging the wellbore while rotating the transducer 210 at a suitable rotation speed enables the transducer 210 to scan the entire inside wall 117 of the wellbore. In one aspect, a motor and gear box 240 may be utilized to rotate the transducer 210 and the transformer 214. Any other arrangement may be used to rotate the transducer 210 for the purposes of this disclosure. The tool 110 may further include a calibration transducer 220 that may be utilized for in-situ determination of the attenuation of the transmitted signals in the wellbore fluid.

Still referring to FIG. 2, the tool 110 further includes electronic circuit 250 configured to, among other things, control the transmission of the acoustic signals 212 into the formation, control amplification of the received acoustic signals, and process the signals received by the transducer 210. The electronic circuit 250, in one aspect, includes an amplification circuit 300 described in more detail in reference to FIG. 3 and FIGS. 4A-4C and a controller 170, which may include a processor 172, a data storage device 174 (such as a solid state memory) and programs 176 accessible to the processor 172 so that the processor may execute instructions contained in the programs 176. The processor 172 also may be configured to define the amplification of the received acoustic signals based on one or more selected criteria, as described in more detail in reference to FIGS. 3 and 4A-4C. The controller 170 also may communicate with the surface controller 140 via a suitable telemetry unit 180. The tool 110 may further include a centralizer 160 configured to maintain the tool 200 along a center line of the wellbore. In one aspect, the centralizer 160 may include a number of spring arms 261a-261n around the longitudinal body of the tool 110 that expand to contact the wellbore inside, thereby maintaining the tool 110 substantially along the center line of the wellbore. Any other device or method of centralizing the tool 110 may be utilized for the purpose of this disclosure.

Figure 3:
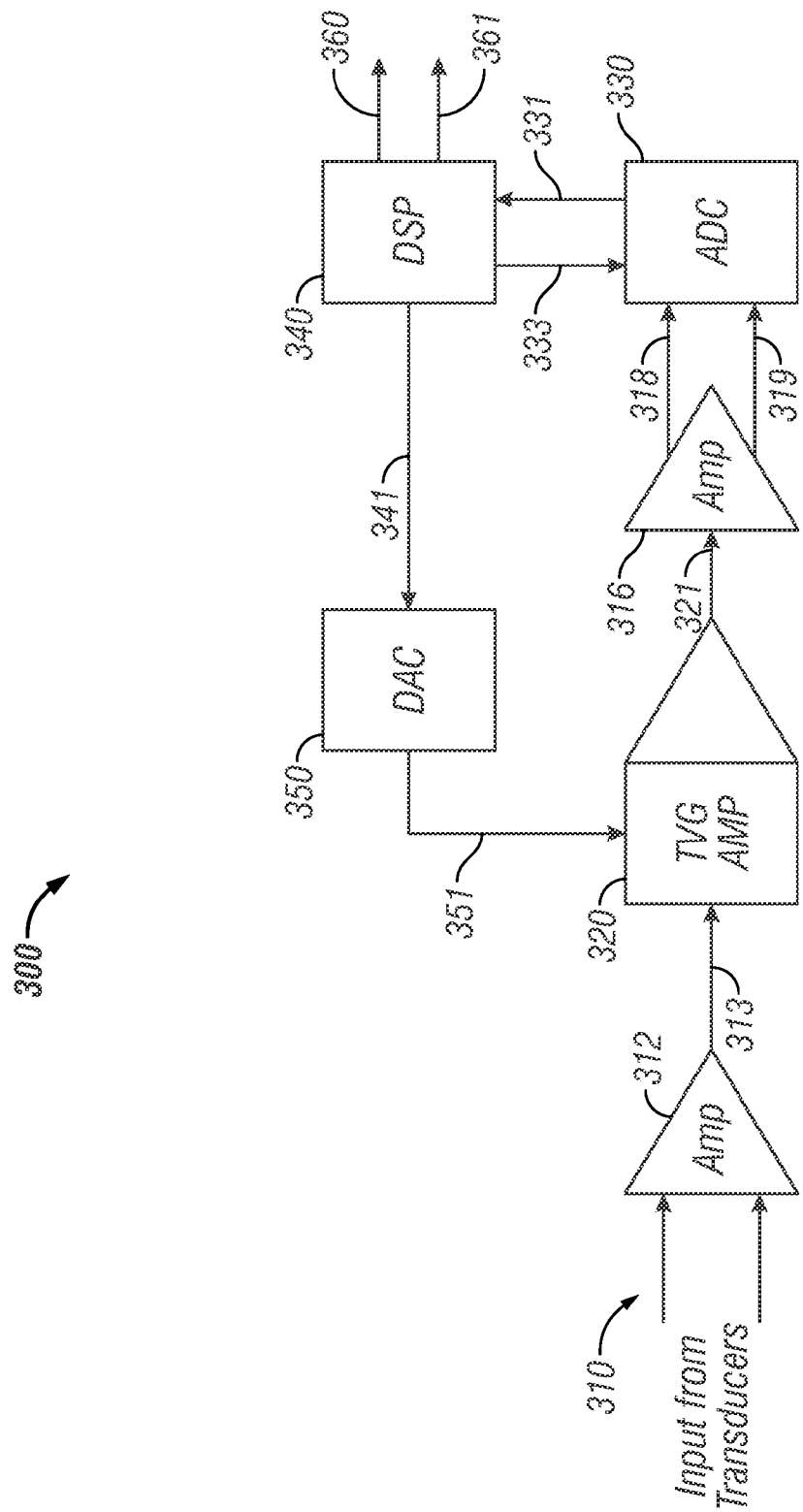
FIG. 3 is a functional diagram of an electrical circuit configured to amplify and process acoustic signals received by a sensor in an acoustic logging tool, such as the tool shown in FIG. 2, according to one embodiment the disclosure.

FIG. 3 is a functional circuit diagram of a circuit 300 made according to one embodiment of the disclosure that may be configured to amplify and process the acoustic signals received by the transducer 210. The circuit 300 is shown to include a first amplifier 312 that amplifies input signals 310 from the transducer 210 and provides a single-ended amplified output 313 to a time-variable gain amplifier (TVG) 320. It is known that ultrasonic signals attenuate when traveling through a wellbore fluid. The signal attenuation in wellbores depends upon the fluid constituents, fluid density and the formation properties. The attenuation is greater in an oil-based mud than is the attenuation in a water-based mud. Also, the attenuation is greater in a heavy (or high density) mud than is in a light (or low density) mud. In aspects, the TVG amplifier 320 may be configured to provide automatic gain compensation for attenuation of the acoustic signals traveling through the wellbore fluid. In one aspect, the TVG amplifier 320 may be configured to ramp up the gain depending upon the attenuation caused by the wellbore fluid and the time of flight of the acoustic signal. The amount of the attenuation may be computed in-situ using the calibration sensor 220 in the tool 110. In one aspect, this method allows smaller gains to be applied early on the received signal, thereby reducing or minimizing the transmitter ring down and other unwanted noise and allows larger gains to be applied to the received signals. In one aspect, attenuation factor (db/cm) and the speed of the signal propagation through a fluid may be utilized to determine the timing and the amount of the gain to be applied by the TVG amplifier 320. In one aspect, the attenuation factor and the speed of the signal through the fluid may be determined by using a fixed gain transducer with a calibration performed in a known medium, such as distilled water. The gain applied by the TVG amplifier 320 may vary with time according to a flow equation, such as G=tK +Fg, where G is the gain to be applied, t is the time and Fg is a known fixed gain for compensation and K is a constant derived from the fixed gain transducer.

Figure 4A:
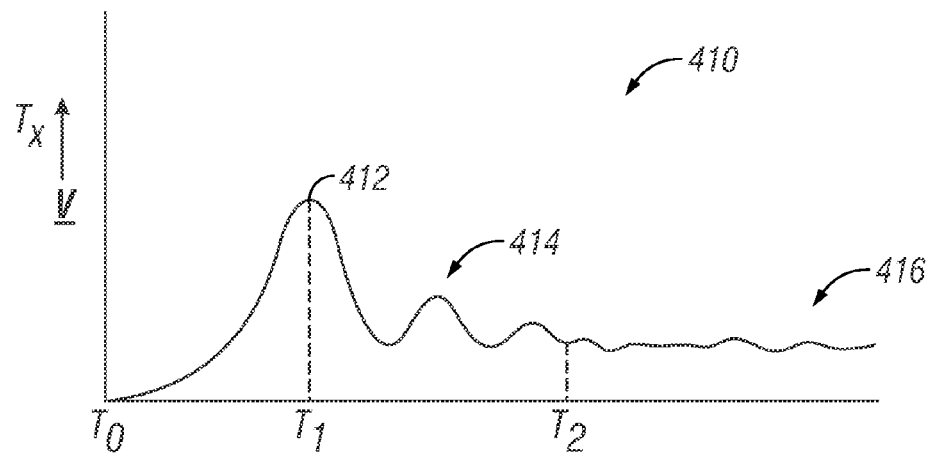
FIGS. 4A-4C respectively show exemplary timing diagrams corresponding to the acoustic signals transmitted by an acoustic transmitter in a wellbore, acoustic signals received by an acoustic receiver in a downhole tool, and gains that may be applied to the received signals by a time-variable gain amplifier made according to one embodiment of the disclosure.
Figure 4B:
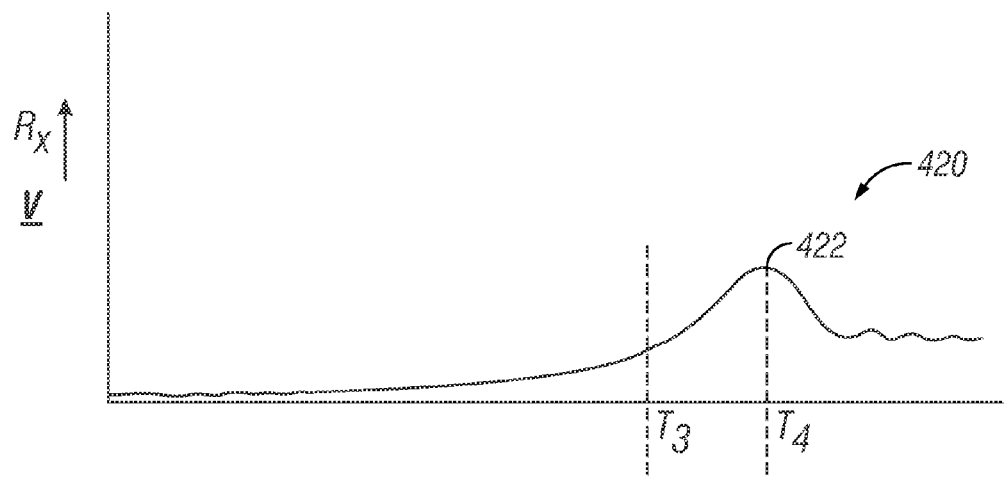
Figure 4C:
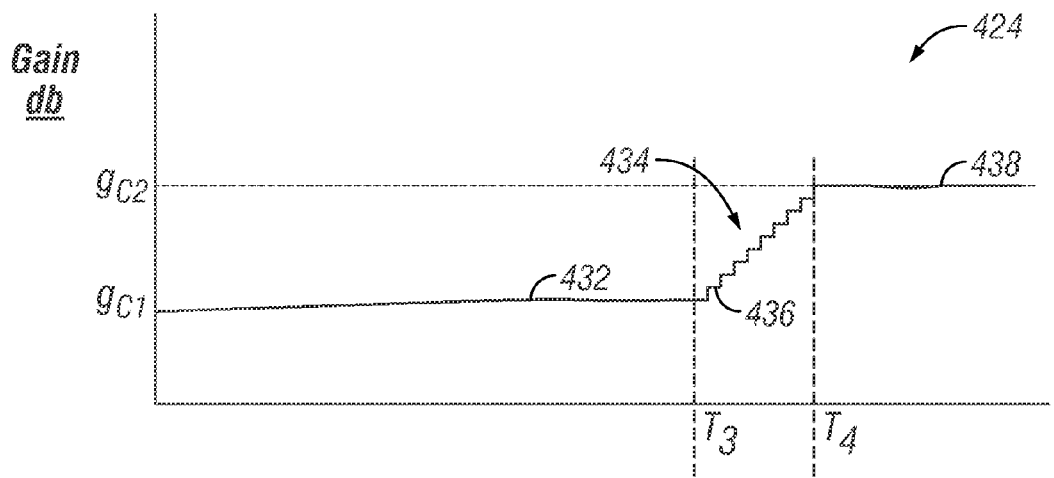

Referring to FIG. 3 and FIGS. 4A and 4B, an exemplary acoustic signal 410 transmitted by the transducer 210 (FIG. 2) is shown to have a peak voltage value 412 at time T1 after the transmitter is fired. The transmitted voltage typically continues to exhibit smaller peaks 414 till time T2 and may further exhibit relatively less ringing 416 thereafter. In one aspect, the TVG amplifier 320 may be configured to apply a relatively constant gain $g_{c1}$ 432 to the received signals starting at time T2. In one aspect, in a time interval 434 from T3 to T4, starting at time T3 the gain may be ramped up till a time T4 to a maximum value $g_{cmax}$ 438. In one aspect, time T4 may be chosen proximate the time where the received signal is expected to exhibit a peak value 422. The gain cycle 424 of the TVG amplifier 320 is repeated for each transmitter firing.

Still referring to FIGS. 3 and 4, the circuit 300, in one aspect, includes a digital signal processor (DSP) 340 configured to control the operation of the TVG amplifier 320. The DSP 340 sends digital signals 341 corresponding to the timing of the gain and the amount of gain to be applied by the TVG amplifier 320 to a digital-to-analog converter (DAC) 350. The DAC 350 converts the digital signals to analog signals 351 and sends them to the TVG amplifier 320. The output single-ended signals 321 from the TVG amplifier 320 are set to an amplifier 316, which converts such signals to output differential signals 318 and 319. The output signals 318 and 319 are fed to an analog-to-digital converter (ADC) 330, which converts such signals to digital signals 331. The DSP 340 controls the operation of the ADC 330 via line 333. The DSP 340 processes the amplified signals and provides the amplitude 360 and the time of arrival 361 of each received signal received by the transducer 210 in response to each signal transmitted by the transducer. In one aspect, the arrival time T4 may be the time at which the amplitude of the received signal 420 is at its peak value 422.

The term processor is used herein in a broad sense and is intended to include any device that is capable of processing data relating to the system 100, including, but not limited to: microprocessors, single-core computers, multiple-core computers, distributed computing systems and field programmable gate arrays (FPGAs). The data storage device or the machine-readable medium referenced in this disclosure may be any medium that may be read by a machine and it may include, but is not limited to, magnetic media, RAM, ROM, EPROM, EAROM, flash memory, hard disks and optical disks. The processing may be performed downhole or at the surface. Alternatively, part of the processing may be performed downhole with the remainder of the processing performed at the surface.

Thus, in one aspect, an apparatus for use in a wellbore is provided that in one embodiment may include at least one transmitter configured to generate acoustic signals in the wellbore, at least one receiver configured to receive acoustic signals from a formation surrounding the wellbore in response to the transmitted acoustic signal and provide electrical signals representative of the received acoustic signals, a circuit configured to apply a time-variable gain to the electrical signals to amplify the electrical signals and a processor configured to process the amplified electrical signals and provide information about a property of interest. The time-variable gain may determined by: determining slowness of the generated acoustic signals in a wellbore fluid; determining attenuation of the acoustic signals in the wellbore fluid; and determining the time-variable gain using the determined slowness and the attenuation of the acoustic signals in the wellbore fluid. In another aspect, determining the time-variable gain may further comprise: determining slowness of an acoustic signal in a known fluid at the surface; determining attenuation of the acoustic signal in the known fluid at the surface; and determining the time-variable gain using the determined slowness and attenuation of the acoustic signals. The time-variable-gain may comprise: (i) a gain having a substantially constant slope over a time period; (ii) a gain having at least two steps 436 of gains over a time period; (iii) a gain having a constant slope for a first time period and a step function for a second time period; (iv) a gain corresponding to a nonlinear function over time; (v) a gain having a constant value for a first period of time, a slope for a second period of time and a step function for a third period of time, wherein the first, second and third time periods are arranged in a desired manner; (vi) a gain having a first constant value for a first time period, a variable gain for a second time period and a gain having second constant value for a third time period; and (vii) a gain function having at least two gains selected from a group consisting of a constant value, a constant slope, a nonlinear slope, and a step function. The transmitted acoustic signal may be directed toward a selected segment of a wellbore wall or produced by a rotating acoustic transmitter in the wellbore. In one aspect, the amplified signals may be converted to digital signals and then processed by a processor to obtain an image of the wall of the wellbore.

The transmitter and the receiver may be configured to rotate at a constant speed or at a varying speed. In another aspect, two transmitters may be disposed about 180 degrees from each other to transmit the acoustic signals radially outward from the tool. In another aspect more than two transducers may be disposed around the tool. In another aspect, a secondary transmitter spaced apart from a secondary receiver may be provided to determine slowness and attenuation of the acoustic signals in the wellbore. The attenuation and slowness may then be used to determine in-situ the time-variable gain. The time-variable gain may be stored in a memory in the tool or at the surface for use during logging of the wellbore.

In another aspect, a method of estimating a property of interest relating to a wellbore is provided, which method in one embodiment may include: determining a time-variable gain relating to a selected fluid; generating acoustic signals in the wellbore; generating signals representative of acoustic signals received by a sensor from the formation responsive to the generated acoustic signals; applying the time-variable gain to the received signals; and processing the amplified signals to estimate the property of interest. Determining the time-variable gain may include: determining slowness of the generated acoustic signals in a wellbore fluid; determining attenuation of the acoustic signals in the wellbore fluid; and determining the time-variable gain using the determined slowness and the attenuation of the acoustic signals in the wellbore fluid. In another aspect, determining the time-variable gain may include: determining slowness of an acoustic signal in a known fluid at the surface; determining attenuation of the acoustic signal in the known fluid at the surface; and determining the time-variable gain using the determined slowness and attenuation of the acoustic signals in the known fluid.

While the foregoing disclosure is directed to the certain embodiments, various modifications and variations will be apparent to those skilled in the art. It is intended that all such modifications and variations be within the scope of the claims.

What is claimed is:

1. A method of estimating a property of interest relating to a formation surrounding a wellbore, comprising:
   determining a first gain value and a second gain value of a time-variable gain from attenuation of acoustic signals in a selected fluid and a timing for ramping between the first gain value and the second gain value from a velocity of the acoustic signals in the selected fluid;
   generating an acoustic signal in the wellbore having the selected fluid;
   generating an electrical signal representative of a received acoustic signal received by a sensor from the formation responsive to the generated acoustic signal;
   applying the determined time-variable gain to the generated electrical signal to amplify the electrical signal to compensate for the attenuation of the acoustic signal when traveling through the selected fluid, wherein the time-variable gain is ramped between the first gain value and the second gain value such that the time-variable gain reaches the second gain value at a time when the generated electrical signal exhibits a peak value; and
   processing the amplified signals to estimate the property of interest.

2. The method of claim 1, wherein determining the time-variable gain comprises:
   determining slowness of acoustic signals in a wellbore fluid;
   determining attenuation of acoustic signals in the wellbore fluid; and
   determining the time-variable gain using the determined slowness and the attenuation of the acoustic signals in the wellbore fluid.

3. The method of claim 1, wherein determining the time-variable gain further comprises:
   determining slowness of acoustic signals in a known fluid at the surface;
   determining attenuation of acoustic signals in the known fluid at the surface; and
   determining the time-variable gain using the determined slowness and attenuation of the acoustic signals in the known fluid.

4. The method of claim 1, wherein the time-variable-gain is selected from a group consisting of: (i) a gain having a substantially constant slope over a time period; (ii) a gain having at least two steps of gains over a time period; (iii) a gain having a constant slope for a first time period and a step function for a second time period; (iv) a gain corresponding to a nonlinear function over time; (v) a gain having a constant value for a first period of time, a slope for a second period of time and a step function for a third period of time, wherein the first, second and third time periods are arranged in a selected manner; (vi) a gain having a first constant value for a first time period, a variable gain for a second time period and a gain having second constant value for a third time period; and (vii) a gain function having at least two gains selected from a group consisting of: a constant value, a constant slope, a nonlinear slope, and a step function.

5. The method of claim 1, wherein generating the acoustic signal comprises generating the acoustic signal by one of (i) directing the acoustic signal toward a selected segment of a wellbore wall; and (ii) rotating an acoustic transmitter in the wellbore.

6. The method of claim 5 further comprising receiving the acoustic signal by a receiver located substantially at or proximate a transmitter location.

7. The method of claim 1, wherein the property of interest is an image of a wall of the wellbore.

8. The method of claim 7 further comprising converting the electrical signal to a digital signal and processing the digital signal by a processor to obtain the image of the wall of the wellbore.

9. An apparatus for use in a wellbore, comprising:
   at least one transmitter configured to generate an acoustic signal in the wellbore having a selected fluid;
   at least one receiver configured to receive an acoustic signal from a formation surrounding the wellbore and generate an electrical signal from the received acoustic signal; and
   a circuit configured to:
      determine a first gain value and a second gain value of a time-variable gain from attenuation of acoustic signals in the selected fluid and a timing for ramping between the first gain value and the second gain value from a velocity of the acoustic signals in the selected fluid; and
      apply the determined time-variable gain to the electrical signal to amplify the electrical signal to compensate for the attenuation of the received acoustic signals when travelling through the fluid, wherein the time-variable gain is ramped between the first gain value and the second gain value such that the time-variable gain reaches the second gain value at a time when the generated electrical signal exhibits a peak value.

10. The apparatus of claim 9, wherein the at least one transmitter and the at least one receiver are located at substantially a common location on the apparatus.

11. The apparatus of claim 9 further comprising a circuit configured to convert the amplified signals to digital signals and a processor configured to process the digital signals to obtain an image of a wellbore wall.

12. The apparatus of claim 9, wherein the at least one transmitter and the at least one receiver are configured to rotate at one of a constant speed and a varying speed.

13. The apparatus of claim 9, wherein the at least one transmitter includes two transmitters disposed about 180 degrees from each other and wherein each transmitter is configured to transmit the acoustic signal radially outward from the apparatus.

14. The apparatus of claim 9 further comprising a secondary transmitter and a secondary receiver spaced apart from the at least one transmitter for determining slowness and attenuation of the acoustic signals in the wellbore.

15. The apparatus of claim 14 further comprising a memory configured to store the determined time-variable gain.

16. The apparatus of claim 9, wherein the circuit applies the time-variable gain to the electrical signals in-situ and a processor processes the amplified signals in-situ to provide an image of the wellbore.

17. A method of estimating a property of interest, comprising:
   generating a selected signal in a wellbore having a selected fluid;
   receiving a signal from a formation in response to the generated selected signal and generating an electrical signal from the received acoustic signal;
   determining a first gain value and a second gain value of a time-variable gain from attenuation of acoustic signals in the selected fluid and a timing for ramping between the first gain value and the second gain value from a velocity of the acoustic signals in the selected fluid;
   applying the determined time-variable gain to the electrical signal to obtain an amplified electrical signal that substantially compensates for the attenuation of the received signal when travelling through the fluid, wherein the time-variable gain is ramped between the first gain value and the second gain value such that the time-variable gain reaches the second gain value at a time when the generated electrical signal exhibits a peak value; and
   processing the amplified electrical signals to estimate the property of interest.

18. The method of claim 17, wherein the selected signal is an ultrasonic signal.

19. The method of claim 17, wherein the time-variable gain is based on at least one property of a fluid in the wellbore.

20. The method of claim 19, wherein the at least one property of the fluid is at least one of: (i) slowness of an acoustic signal in a fluid; (ii) attenuation of an acoustic signal in a fluid.

* * * * *